United States Patent [19] [11] 4,005,056
Dunwald et al. [45] Jan. 25, 1977

[54] PROCESS FOR THE PREPARATION OF POLYHYDANTOINS AND POLYPARANIC ACIDS

[75] Inventors: Willi Dunwald, Leverkusen; Jürgen Lewalter, Cologne; Rudolf Merten, Leverkusen, all of Germany

[73] Assignee: Bayer Aktiengesellschaft, Germany

[22] Filed: Jan. 30, 1975

[21] Appl. No.: 545,380

[30] Foreign Application Priority Data
Feb. 1, 1974 Germany .......................... 2404741

[52] U.S. Cl. ........................................ 260/77.5 CH
[51] Int. Cl.$^2$ ........................................ C08G 18/00
[58] Field of Search ........................... 260/77.5 CH

[56] References Cited
UNITED STATES PATENTS

| 3,397,253 | 8/1968 | Merten et al. | 260/77.5 CH |
| 3,448,170 | 6/1969 | Merten et al. | 260/77.5 CH |

Primary Examiner—M. J. Welsh
Attorney, Agent, or Firm—Connolly and Hutz

[57] ABSTRACT

Process for the preparation of polyhydantoins or polyparabanic acids, characterized in that bis- or polyglycine derivatives or bis- or poly-monoamidooxalic acid derivatives are heated to temperatures of 20° to 250° C with di- or polyiso(thio)cyanate derivatives without solvents and the highly fluid melt which has a melt viscosity of at the most 40,000 m.Pa.s. is optionally subjected to a shaping process and is polycondensed by adjustment to the reaction of 80° to 700° C.

25 Claims, No Drawings

PROCESS FOR THE PREPARATION OF POLYHYDANTOINS AND POLYPARANIC ACIDS

This invention relates to a process for the solvent-free preparation of polyhydantoins and polyparabanic acids.

Polyhydantoins and polyparabanic acids are already known. They constitute high-temperature resistant raw materials for varnishes. Processes for their preparation have been described in French Pat. No. 1,484,694; U.S. Pat. No. 3,397,253 and in German Offenlegungsschrift No. 1,770,146 and U.S. Pat. No. 3,609,113.

In general, these polymers are obtained by reacting polyisocyanates or polyisothiocyanates with diglycine or polyglycine derivatives or with bis- or polymonoamidooxalic acid derivatives. To make the polymers suitable for technical uses, these reactions must be carried out in organic solvents, usually phenolic solvents. But the highly viscous solutions thus obtained have relatively low solids content. When these polymers are used for the production of coatings one has to remove large quantities of particularly unpleasant solvents which give rise to environmental problems. Moreover, it is often necessary, particularly when enamelling thin wires, to apply a larger number of individual coats (up to 12) in order to obtain a continuous covering.

This invention relates to a process for the preparation of polyhydantoins or polyparabanic acids wherein a bisglycine or polyglycine derivative or a bis- or polymonoamidooxalic acid derivative is heated to a temperature of preferably from 20° to 250° C, more preferably 70° to 180° C, with a di- or polyiso(thio)cyanate derivative in the absence of solvent, the highly fluid melt thus obtained, which has a viscosity of at the most 40,000 m.Pa.s. is optionally subjected to a shaping process and is then polycondensed by heating to the reaction temperature of preferably 80° to 700° C, more preferably 150° to 400° C.

Di- or polyglycine derivatives within the meaning of this invention are preferably compounds of the formula I

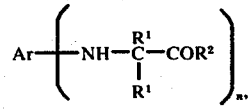

in which Ar represents an n-valent aromatic group, the $R^1$ substituents, which may be the same or different, represent hydrogen, aryl or alkyl with preferably 1 to 4 carbon atoms, $R^2$ represents hydroxyl, amino, alkylamino, dialkylamino, alkoxy or aroxy and $n$ represents 2, 3 or 4. The aromatic groups Ar preferably have 6 to 12 carbon atoms and may also contain hetero atoms such as oxygen or sulphur. Groups derived from benzene, toluene, diphenyl, diphenylmethane, diphenylether or diphenyl sulphide are examples. The alkyl groups contained in the substituent $R^1$ or $R^2$ preferably have 1 to 4 carbon atoms while the aryl groups contained therein preferably have 6 to 10 carbon atoms. The following are examples of such compounds:

N,N'-bis-[ethoxycarbonylmethyl]-4,4'-diaminodiphenylmethane;

N,N'-bis-[2-methoxycarbonylpropyl-(2)]-4,4'-diaminodiphenylmethane;

N,N'-bis-[2-methoxycarbonylpropyl-(2)]-4,4'-diaminodiphenyl ether and

N,N'-bis-[2-methoxycarbonylpropyl-(2)]-1,3-diaminobenzene.

Polyglycine derivatives and their preparation are already known in principle (see German Offenlegungsschriften No. 1,570,552; U.S. Pat. No. 3,397,253; German Offenlegungsschrift No. 1,595,646; British Patent No. 1,176,844; German Offenlegungsschrift No. 1,595,647 and British Pat. No. 1,144,409). The compounds may be prepared, for example, by reacting polyamines with α-haloacetic acid derivatives or by condensing aldehydes or ketones with hydrocyanic acid and then converting the nitrile group to the ester group.

Bis- or polymonoamidooxalic acid derivatives in accordance with this invention are preferably compounds of formula II

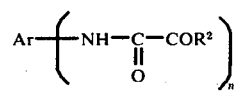

in which Ar, $R^2$ and $n$ have the same meaning as in formula I. The following are examples: N,N'-bis-[ethoxyoxalyl]-4,4'-diaminodiphenylmethane and N,N'-bis-[ethoxyoxalyl]-4,4'-diaminodiphenylether.

Monoamidooxalic acid derivatives and their preparation are also already known (see German Offenlegungsschrift No. 1,770,446). These compounds can be obtained, for example, by reacting polyamines with an excess of oxalic acid esters.

Di- and polyiso(thio)cyanate derivatives which decompose to revert to the corresponding di- or polyisocyanate or isothiocyanate will hereinafter be referred to as "blocked polyisocyanates". They are reaction products of di- or polyiso(thio)cyanates with compounds, generally of low-molecular weight, which contain Zerewitinoff-active hydrogen atoms. They generally decompose only at temperatures above 50° C, preferably above 80° C, to revert to the isocyanates from which they are derived. The low-molecular weight compounds with Zerewitinoff-active hydrogen atoms which are constituents of the blocked polyisocyanates will hereinafter be referred to as "blocking agents".

Blocked polyisocyanates can be obtained in known manner by reacting the polyiso(thio)cyanates with equivalent or excess quantities of blocking agents with or without an inert solvent at temperatures of −20° to 250° C.

The blocking agents used for the purpose of this invention are preferably alcohols, in particular aliphatic monoalcohols with 1 to 16 carbon atoms and cycloaliphatic alcohols with 5 to 12 carbon atoms such as methanol; ethanol; propanol; isopropanol; butanol; tert. butanol; isobutanol; pentanol; hexanol; cyclohexanol; benzyl alcohol; ethylene chlorohydrin or glycol monomethyl ether or glycol monoacetate; aliphatic diols and polyols with 1 to 12 carbon atoms such as ethylene glycol; diethylene glycol; propylene glycol; glycerol; dimethylolpropane and hexanetriol; phenols with 6 to 12 carbon atoms such as phenol itself, the isomeric cresols; xylenes; alkylphenols; substituted phenols such as nitrophenols; oximes such as acetone oxime; cyclohexanone oxime or methylethylketone oxime; secondary amines, in particular secondary alkylamines with 1 to 10 carbon atoms such as diethylamine, dimethylamine, secondary alkyl arylamines with 7 to 17 carbon atoms such as N-methyl aniline or N-propyl aniline, secondary aromatic amines with 12 to 36 carbon atoms such as diphenylamine and cyclic amines such as piperidine, pyrrolidone, morpholine, pyrazole or indole; cyclic amides, in particular cyclic aliphatic amides such as lactams which have at least 5 ring members such as caprolactam or α-pyrrolidone and heterocyclic amides such as hydantoin, 5,5-dimethylhydantoin or 3-phenyl-5,5-dimethyl-hydantoin or isatin as well as compounds which contain activated (acidic) CH—groups such as diethyl malonate or acetyl acetone.

The blocked polyisocyanates may be based on any of the known isocyanates, for example polyiso(thio)cyanates of the general formula

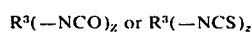

in which $R^3$ represents an alkyl group with 1 to 20 carbon atoms which may be substituted, an aromatic group with 5 to 12 carbon atoms which may be substituted, a cycloalkyl group with 4 to 12 carbon atoms, an aliphatic-aromatic group with 6 to 36 carbon atoms which may be substituted or an aromatic or cycloaliphatic group with 3 to 12 carbon atoms which contains hetero atoms such as nitrogen, oxygen or sulphur. The alkyl groups which may be attached to the aromatic group preferably have 1 to 5 carbon atoms. Particularly preferred are alkyl groups with 2 to 6 carbon atoms and phenyl, tolyl, naphthyl, diphenylmethane and diphenylether groups. Z is an integer of from 1 to 4, preferably 2 or 3.

Isocyanates of this kind have been described, for example, in Annalen 562, pages 75 to 136. The following are specific examples of such isocyanates: ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and any mixtures of these isomers; 1-isocyanato-3,3,5-trimethyl-5-isocyanatomethylcyclohexane (German Auslegeschrift No. 1,202,785); hexahydrotolylene-2,4- and -2,6-diisocyanate and any mixtures of these isomers; hexahydrophenylene-1,3- and/or -1,4-diisocyanate; perhydrodiphenylmethane-2,4'- and/or -4,4'-diisocyanate; phenylene-1,3- and 1,4-diisocyanate; tolylene-2,4- and -2,6- diisocyanate and any mixtures of these isomers; diphenylmethane-2,4'- and/or -4,4'-diisocyanate; naphthylene-1,5-diisocyanate; triphenylmethane-4,4',-4''-triisocyanate; polyphenyl-polymethane polyisocyanates of the kind described e.g. in British Pat. No. 874,430 and 848,671 which can be obtained by aniline-formaldehyde condensation followed by phosgenation; perchlorinated aryl polyiisocyanates of the kind described e.g. in German Auslegeschrift No. 1,157,601; polyisocyanates which contain carbodiimide groups as described in German Pat. No. 1,092,007; the diisocyanates described in U.S. Pat. No. 3,492,330; polyisocyanates with allophanate groups as described e.g. in British Pat. No. 994,890; Belgian Pat. No. 761,626 and published Dutch Patent application No. 7,102,524; polyisocyanates which contain isocyanurate groups as described e.g. in German Pat. No. 1,022,789; 1,222,067 and 1,027,394 and in German Offenlegungsschriften Nos. 1,929,034 and 2,004,048; polyisocyanates which contain urethane groups as described e.g. in Beligan Pat. No. 752,261 or in U.S. Pat. No. 3,394,164; polyisocyanates which contain acylated urea groups in accordance with German Pat. No. 1,230,778; polyisocyanates which contain biuret groups as described e.g. in German Pat. No. 1,101,394; British Pat. No. 889,050 and French Pat. No. 7,017,514; polyisocyanates which have been prepared by telomerisation reactions as described e.g. in Belgian Pat. No. 723,640; polyisocyanates which contain ester groups, such as those mentioned e.g., in British Pat. No. 956,474 and 1,072,956; U.S. Pat. No. 3,567,763 and German Pat. No. 1,231,688; reaction products of the above mentioned isocyanates with acetylene in accordance with German Pat. No. 1,072,358 and sterically hindered aromatic polyiso(thio)cyanates, for example those which contain alkyl groups with 1 to 5 carbon atoms in the ortho-position to the iso(thio)cyanate group.

Polyurethane prepolymers which contain two or more iso(thio)cyanate groups which are in end positions may also be used. They can be obtained by reacting an excess of the aforesaid polyiso(thio)cyanates with polymeric compounds which contain active hydrogen atoms, for example polyethers or polyesters. Suitable polyethers can be obtained by known methods of addition polymerisation of one or more alkylene oxides such as ethylene, propylene, butylene or styrene oxide with one or more polyols such as ethylene; diethylene or propylene glycol; glycol; trimethylolpropane; hexanetriol; pentaerythritol; sorbitol or mannitol.

Suitable polyesters are obtained by known methods, for example by reacting one or more polyols such as ethylene glycol; propylene glycol; diethylene glycol; triethylene glycol; tetraethylene glycol; butylene glycol; N,N'-1,3-bis-hydroxyethyl-hydantoin; 1,4-bis-hydroxyethyl-terephthalate; 1,1,1-trimethylolpropane; glycerol; pentaerythritol or hexanetriol with one or more polycarboxylic acids such as oxalic; succinic; glutaric; adipic; pimelic; suberic; azelaic; sebacic; maleic, fumaric, itaconic; phthalic; isophthalic or terephthalic acid or anhydrides thereof. The molecular weights of the polyethers or polyesters depend on the purpose for which the products are used and are generally between 100 and 5,000, preferably between 100 and 2,000.

The distillation residues obtained from the commercial production of isocyanates and still containing isocyanate groups may also be used, optionally dissolved in one or more of the above mentioned polyisocyanates. Any mixtures of the above mentioned polyisocyanates may also be used.

Commercially readily available mixtures of tolylene diisocyanates; m-phenylene diisocyanate; phosgenated condensates of aniline and formaldehyde which have a polyphenylene-methylene structure; the symmetric compounds 4,4'-diisocyanatodiphenylmethane; 4,4'-diisocyanato-diphenylether; p-phenylene diisocyanate and 4,4'-diisocyanato-diphenyl-dimethylmethane; analogous hydroaromatic diisocyanates and hexamethylene diisocyanate are preferred.

In a particular embodiment of the process according to the invention, mixtures of blocked polyiso(thio)cyanates are used in which 1 to 99, preferably 50 to 99 equivalent percent of the polyiso(thio)cyanates are blocked with alkanol or cycloalkanol and 99 to 1, preferably 50 to 1 equivalent percent are blocked with phenols such as phenol; cresol; xylene; ethyl phenol; nitrophenol; lactam; ε-caprolactam; diethyl malonate; acetyl acetone or oximes such as cyclohexanone oxime or methyl ethyl ketone oxime.

To carry out the process according to the invention, the starting compounds may first be mixed and the mixture may then be heated to temperatures of 20° to 250° C, preferably 70 to 180° C. A highly fluid homogeneous melt is thereby obtained which has a melt viscosity of not more than 40,000 m.Pa.s. This melt, hereinafter referred to as "primary melt", can be completely condensed by raising the temperature to 80° to 700° C, preferably 150° to 400° C. If the product is required for producing coatings, the primary melt is generally applied to the substrate and then heated on it. This operation is preferably carried out in stoving oven.

The melt process also provides new aspects for the construction of lacquering furnaces. For example, the coated material may be passed through a tube which is heated by induction, or coated metal articles, particularly if they have a large cross-section, may themselves be heated to the required stoving temperatures by high frequency.

The primary melt is generally stable, i.e. its viscosity remains unchanged for a long time, e.g. several weeks, at the temperature employed for preparing the primary melt or lower temperatures.

The basic process may be altered or modified in various ways. The starting components are normally used in as far as possible equivalent quantities. If desired, all of the components may be melted together but, if preferred, one component may first be melted on its own, for example the blocked polyisocyanate, and the other components may then be added slowly. It is not even necessary to prepare the blocked polyisocyanate separately. If preferred, the blocking agent may be added to the polyisocyanate and the mixture may be heated to a temperature at which the blocking reaction takes place, and the glycine or monoamidooxalic acid derivative may then be added.

The preparation of the primary melt may also be subdivided into several stages, in which case part of the masked polyisocyanate may first be melted together with the total quantity of glycine or monoamidooxalic acid derivative or conversely, and the quantity of reactant required to bring it up to the equivalent proportion may then be added.

According to a further modification, the reaction is carried out not with one blocked polyisocyanate but with several. One and the same polyisocyanate may be blocked with several blocking agents (in this way the velocity and temperature of decomposition to the original polyisocyanate can be influenced) or various isocyanates may be blocked with the same or with different blocking agents (in this way the properties of the condensed material, the processing temperature and processing properties can be influenced). It is also possible to use several glycine or monoamidooxalic acid derivatives or to use both glycine and monoamidooxalic acid derivatives (the properties of the end product are thereby altered).

In all of these reactions it is essential to use the blocked polyisocyanate and glycine or monoamidooxalic acid derivative in equivalent quantities.

If the blocked isocyanates and/or glycine derivatives and/or monoamidooxalic acid derivatives are in part or entirely more than bifunctional, cross-linked products are finally obtained.

Part, preferably up to 20 mol-% of the blocked polyiso(thio)cyanate may also be replaced by a blocked monoisocyanate or monoisothiocyanate.

Suitable monoiso(thio)cyanates for the purpose of the invention include aliphatic and aromatic compounds which have one isocyanate group in the molecule and which may be substituted by hetero atoms, e.g. alkyl isocyanates such as ethyl, methyl, butyl, dodecyl or stearyl isocyanate; aromatic monoisocyanates which may be substituted such as phenyl, tolyl, isopropyl, or nonyl isocyanate; nitro, alkoxy, aroxy, chloro, dichloro, trichloro, tetrachloro, pentachloro, benzyl or bromophenyl isocyanate or isocyanato-benzoic acid esters, -phthalic acid esters or -isophthalic acid esters; isocyanatobenzonitrile; cycloaliphatic isocyanates such as cyclohexyl isocyanate and unsaturated isocyanates such as allyl, oleyl or cyclohexenyl isocyanate.

These monoisocyanates are blocked with the same blocking agents and by the same methods as the diisocyanates and polyisocyanates.

Lastly, the primary melt may be briefly heated to a temperature above that at which the blocked polyisocyanates decompose to revert to the corresponding polyisocyanates. Part of the melt is thereby converted into short-chain condensates. The change in the melt is spectroscopically detectable although the viscosity remains substantially unchanged or may even drop. By adding other additives it is even possible to obtain a primary melt which remains liquid at room temperature.

The method employed for processing the highly fluid primary melt depends on the purpose for which it is intended.

The melt usually solidifies on cooling and may then be size-reduced and stored. It is then remelted when required for use and is not thereby altered. It may also be pulverised and used for electrostatic powder spraying lacquering. Conventional application from solution may also be envisaged.

The blocked polyisocyanates generally have a very high thermal stability. The blocking is surprisingly preserved unchanged even at temperatures up to 250° C and in mixtures with polyglycine derivatives or polymonoamidooxalic acid derivatives. This ensures that the finished mixtures will have a sufficiently long pot life for practical requirements. The highly liquid melts may be mixed preferably with up to 70 % of any precondensates, polyesters, epoxide resins, polyurethanes or other functional polymers.

When the products are applied as primary melts, they must be condensed in suitable stoving ovens after application and, if necessary, hardened. Temperature-resistant and chemically and physically extremely resistant coatings, foils or shaped products are thereby obtained at temperatures preferably between 80° and 700° C, more preferably 150° to 400° C. The spectroscopic data clearly show the expected heterocyclic bands at 1710 cm$^{-1}$ with the typical foreband at 1755 cm$^{-1}$.

Condensation and hardening are generally carried out most suitably on the material which is to be coated or the film substrate or support. The blocked polyiso(thio)cyanates then react with the polyglycine or polymonoamidooxalic acid derivatives and possible additives under the temperature conditions of the stoving oven, possibly after regeneration of the iso(thio)cyanate functions. Chain formation, chain-lengthening or cross-linking takes place to form high-molecular weight materials. Cross-linked substances can also be obtained from masked iso(thio)cyanates which have a higher valency than 2 or glycine or monoamidooxalic acid derivatives which are polyfunctional.

In the melt process, the reaction velocities required for commercial production are achieved without modification of the stoving ovens by virtue of the fact that the stoving heat acts directly on the reaction mixture. The solvent evaporation process previously required, which was highly energy-consuming and which delayed the reaction, is now eliminated. As soon as the melts applied to their substrates enter the oven, they reach the required deblocking or condensation temperatures of the masked polyiso(thio)cyanates. There are no significant stoving losses in spite of the fact that relatively low-molecular weight starting products are used, because at the relatively high stoving temperatures employed, the low-molecular weight compounds immediately become anchored in the polymer as this is formed. The blocking agent generally leaves the reaction mixture rapidly at the stoving temperatures. In contrast to the solvent previously used, the blocking agents are unsuitable both in the quantity in which they are used and in their chemical and physical properties to form azeotropic mixtures with the reaction components.

The melt process thus provides numerous advantages for commercial production. Whereas at the stoving stage of the solution process the possible increase in molecular size is very limited owing to the difficult problem of solvent evaporation and it is therefore necessary to start with substantially prefinished polymers, the melt process can directly process low-molecular weight products. With the low viscosity melts it is now possible, for example, to obtain layers of the required thickness with only a few applications and in some cases only with a single application, since, apart from small quantities of blocking agents and possibly other additives the whole of the material applied is built into the synthetic resins, coatings or foils. The small quantities of low-molecular weight blocking agents escape on condensation of the reactants under the stoving conditions without leaving craters or other flaws in the layer of the coating. The explosion limit of the mixtures of air and blocking agent are not reached by long way. At least in the case of wire enamelling it is possible to carry out simultaneous enamelling of several wires in an existing enamelling installation.

The temperature in the stoving oven is generally sufficiently high for condensation. The condensation reaction may be accelerated by known isocyanate polyaddition catalysts. The following are examples of suitable catalysts:

1. Tertiary amines such as triethylamine; tributylamine; N-methylmorpholine; N-ethyl morpholine; N-cocomorpholine; N,N,N',N'-tetramethyl-ethylenediamine; 1,4-diaza-bicyclo-(2,2,2)-octane; N-methyl-N'-dimethylaminoethyl-piperazine; N,N-dimethyl benzylamine; bis-(N,N-diethylaminoethyl)-adipate; N,N-dimethyl benzylamine; pentamethyl diethylenetriamine; N,N-dimethyl cyclohexylamine; N,N,N',N'-tetramethyl-1,3-butanediamine; N,N-dimethyl-β-phenylethylamine; 1,2-dimethyl imidazole and 2-methyl imidazole.

2. Tertiary amines containing hydrogen atoms which are reactive with isocyanate groups, e.g. triethanolamine; triisopropanolamine; N-methyl-diethanolamine; N-ethyl-diethanolamine; N,N-dimethylethanolamine and their reaction products with alkylene oxides such as propylene oxide and/or ethylene oxide.

3. Silaamines with carbon-silicon bonds (see German Pat. No. 1,229,290), e.g. 2,2,4-trimethyl-2-silamorpholine or 1,3-diethylaminomethyl-tetramethyl disiloxane.

4. Nitrogen-containing bases such as tetraalkyl ammonium hydroxides and hexahydrotriazines.

5. Organic metal compounds, in particular of iron, lead and/or tin. The organic tin compounds used are preferably tin(II)salts of carboxylic acids such as tin(II)acetate; tin(II)octoate; tin(II)ethyl hexoate and tin(II)laurate and dialkyl tin(IV)salts such as dibutyl tin dichloride, acetate, laurate or maleate; dioctyl tin diacetate or dimethyl tin divalerate; also iron salts such as iron acetyl acetonate or iron chloride; lead oxide; lead carbonate or lead carboxylates.

6. Aromatic hydroxy compounds, in particular phenols; isomeric cresols; ethyl phenols; xylenes; chlorphenols; methoxy phenols; nitro-phenols; thio-phenols and resorcinol.

7. Phenol Mannich bases (see Kunststoffe Volume 62, pages 731 (1972)), e.g. 2-(dimethylaminomethyl)-phenol and 2-(dimethylaminomethyl)-4-isononyl-phenol.

Other suitable catalysts have been described in Kunststoff-Handbuch, Volume VII, published by Vieweg and Hochtlen, Carl-Hanser-Verlag, Munich 1966, on pages 96 to 102, and in High Polymers, Volume XVI, part I, (Polyurethane-Chemistry) published by Saunders and Frisch, Interscience Publishers, New York 1962, on pages 129 to 217.

Organometallic catalysts are particularly effective, especially organic tin catalysts. The condensation velocity of the iso(thio)cyanate groups can be very considerably increased with these catalysts so that the reaction time can be shortened or the condensation and stoving temperature considerably reduced for the same reaction time. This is very important, for example, for complete hardening on very high-speed wire lacquering machines.

When catalysts are used, the interval between the melting temperature, deblocking temperature and condensation temperature may in some individual cases be very small so that the necessary safety margin for processing may be impaired.

This can be avoided by using so-called latent catalysts which, similar to blocked isocyanates, are liberated and thus active only at elevated temperatures. The following are examples of latent catalysts:

1. Reaction products of aromatic hydroxyl compounds and phenol Mannich bases (see German Offenlegungsschrift No. 2,325,927), e.g. phenol; isomeric cresols; ethyl phenols; xylenes; chlorophenols; methoxy phenols; nitrophenols; thiophenols; resorcinol and 2-(dimethylaminomethyl)-phenol or 2-(dimethylaminomethyl)-4-isononyl phenol with polyisocyanates.

These compounds are "blocked polyisocyanates". The underlying hydroxyl compounds or phenol Mannich bases become catalytically active when they decompose. In this way, they come into action at the same time as the isocyanates are deblocked by heat.

2. Quaternary ammonium salt of Mannich bases such as 2-(trimethyl ammonium methyl)-cyclohexanone chloride (see U.S. Pat. No. 2,950,262).

3. Tertiary ammonium salts of organic acids such as triethyl ammonium trichloroacetate; bis-trimethyl ammonium oxalate; N-ethyl morpholinium acetate; N,N- dimethyl benzyl ammonium propionate; triethylene diammonium diacetate or bis-dimethyl ethanol ammonium succinate.

4. Cyclic or bicyclic amidines such as 2,3-N-dimethyltetrahydro-$^1\Delta$-pyrimidine.

5. Organic metal compounds, particularly of lead and/or tin. Suitable organic lead compounds (see U.S. Pat. No. 3,474,075) are particularly tetraphenyl lead; tetraethyl lead; diphenyl lead diacetate and hexaphenyl di-lead.

The following are suitable tin compounds (see German Auslegeschrift No. 1,272,532 and U.S. Pat. No. 3,523,103): tetra-n-butyl-1,3-diacetoxy-distannoxane; hexaphenyl di-tin and hexa-n-butyl di-tin.

6. Polyiso(thio)cyanates which are blocked with amines and/or amides. The amines/amides may be used alone or in addition to other blocking agents. The amines liberated at high temperatures act as accelerators. Suitable amines and/or amides include, for example, dimethylamine; diethylamine; dibutylamine; diphenylamine; N-methyl aniline; N-methyl benzylamine; hydantoin; 5,5-dimethyl hydantoin; 3-phenyl-5,5-dimethyl hydantoin; caprolactam; pyrrolidone; pyrrolidine, piperidine; morpholine; pyrazole; imidazole; indole and isatin.

The catalysts are generally used in a quantity of 0.01 to 5.0 % by weight, preferably 0.1 to 1.0 % by weight, based on the blocked isocyanates. In some cases it is advisable to add the catalysts to the melts only immediately before application of the melt.

The polyhydantoins or polyparabanic acids obtained according to the invention may be high-molecular weight or low-molecular weight compounds, depending on the reaction conditions. It is generally advantageous to use the reactants in equivalent quantities although the process according to the invention may also be carried out with distinct deviations from the stoichiometric proportions. In this way the reactants and their molar ratios may be selected to produce either high-molecular weight or low-molecular weight products.

An example of the synthesis of linear polymers by the stoichiometric reaction of stoichiometric quantities of a blocked diisocyanate and of a bisfunctional glycine or monoamidooxalic acid derivative is represented in equations 1 and 2:

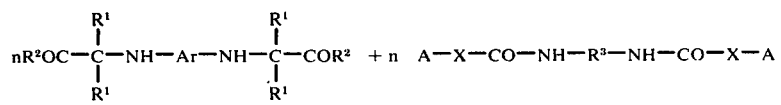

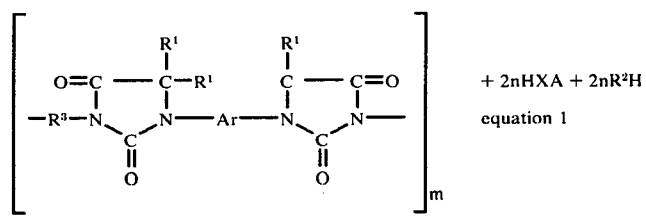

+ 2nHXA + 2nR²H equation 1

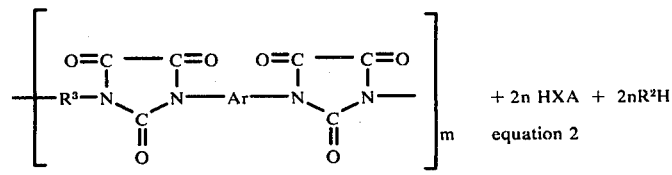

+ 2n HXA + 2nR²H equation 2

In these equations, $R^1$, $R^2$ and $R^3$ have the meanings already specified,

X represents O, S or a covalent bond, m represents a number from 5 to 1000 and

A represents an alkyl group with 1 to 12 carbon atoms, an N,N-dialkylamino group with 1 to 10 carbon atoms in each alkyl group, an N,N-alkyl arylamino group with 1 to 5 carbon atoms in the alkyl group and 6 to 12 carbon atoms in the aryl group, an N,N-diarylamino group with 6 to 18 carbon atoms in each aryl group, an alkylaryl group with 7 to 16 carbon atoms, an aryl group with 6 to 12 carbon atoms or an alkyl, aryl or cycloalkyl group with 1 to 12 carbon atoms which contain hetero atoms such as nitrogen, oxygen or sulphur and may contain at least one carbonyl group.

The reactions may also be applied to polyfunctional starting materials, i.e. glycine or monoamidoxalic acid derivatives with more than two glycine or monoamidooxalic acid derivative functions and to polyisocyanates with more than two isocyanate groups. Branched molecules are obtained in this case.

If, on the other hand, for example a quantity of $2/p$ to $4/p$ mol of the polyiso(thio)cyanate derivative with $p$ blocked isocyanate groups per molecule is used for 1 mol of the bis-glycine or bis-monoamidooxalic acid derivative, then if $p$ is $> 1$, preferably $p=2$, products of formulae III or IV are obtained, formula III applying to polyhydantoins:

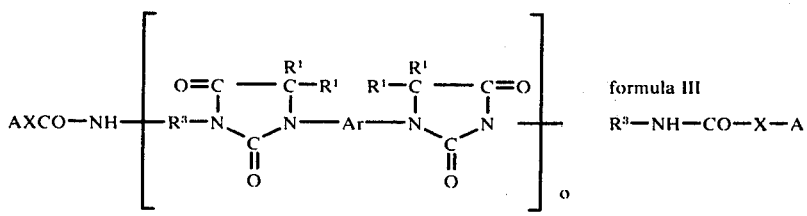

formula III and formula IV to polyparabanic acids:

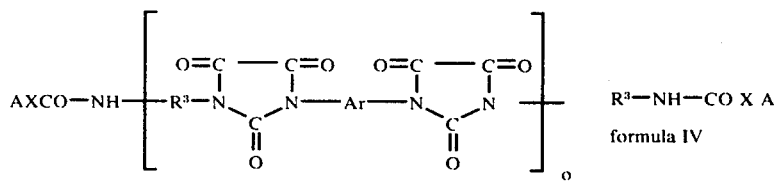

formula IV in which o = 1 to 500 and

A, X, Ar and $R^3$ have the meanings already specified.

The excess iso(thio)cyanate groups which may still be blocked may be crosslinked or converted by the addition of suitable auxiliary agents or additives. Other polymers may also be added in the process according to this invention, e.g. polyesters; polyamides; polyurethanes; polyethers; polyolefines; polyacetals; polyepoxides; polyimides; polyamide imides; polyester imides or polyimide isocyanates.

Materials of this kind may be added to the starting components or to the primary melt obtained according to this invention or they may be incorporated by polymerisation.

One special embodiment of the process consists in adding low-molecular weight polyols and hydroxyl-containing epoxides; urethanes; imide esters; hydantoins; polyesters and polyethers as well as polyamines; preferably low-molecular weight diamines, amino alcohols, polyamides, polyester imides and polyamido imines and at the same time using excess quantities of iso(thio)cyanate components. This technique results in a combination of (thio) hydantoin or (thio) parabanate and urethane or urea formation. For this purpose mixtures, for example, of the polyhydroxyl and/or polyamino compound, blocked polyiso(thio)cyanate and polyglycine or poly-monoamidooxalic acid derivative are converted into the synthetic resin in one simultaneous and final operation, if indicated after precondensation of two of these components. Here again stoichiometric proportions may be employed although substantial deviations from these proportions are possible and the properties of the polymer may vary with regard to the elasticity while the heat shock properties are in all cases satisfactory.

The polyols used may, for example, be diols such as glycol; diethylene-, triethylene-, tetraethylene-, propylene- or dipropylene glycol; hexane-1,6-diol; 1,4-bis-hydroxymethyl cyclohexane; 1,4-is(2-hydroxyethoxy)-benzene; 2,2-bis-(4-hydroxycyclohexyl)-propane; 1,4-hydroxymethyl benzene; 1,5-bis-(2-hydroxy-ethoxy)-naphthalene; 2,2-bis[4-(2-hydroxyethoxy)-phenyl]-propane; bis-(2-hydroxyethyl)-terephthalate; N,N'-bis-(2-hydroxyethyl)-1,3-hydantoin or N,N'-bis-(2-hydroxyethyl)-pyromelithimide; triols such as glycerol; trimethylol ethane; trimethylolpropane or tris-(2-hydroxyethyl)-isocyanurate or polyols such as pentaerythritol, sorbitol or mannitol.

The following are examples of polyamines which may be used: ethylene diamine; 1,4-diaminocyclohexane; 4,4'-diaminodicyclohexylmethane; ethanolamine; N-methyl-ethanolamine; bis-(2-hydroxyethyl)-amine; m- or p-phenylenediamine; 4,4'-diaminodiphenylmethane and 4,4'-diaminodiphenylether.

Suitable epoxides are, for example, those obtained from 4,4'-dihydroxy diphenyl dimethylmethane, resorcinol or hydantoins and epichlorohydrin, with moleculr weights of the monomer unit of up to 4000.

Known types of polyesters with hydroxyl groups may be used, e.g. those obtained from polycarboxylic acids such as succinic, adipic, sebacic, phthalic, isophthalic, terephthalic or oleic acid and polyalcohols such as glycol, diethylene glycol, triethylene glycol, propylene glycol, dipropylene glycol, glycerol, trimethylolpropane or pentaerythritol in the usual manner.

The polymers obtained by the process according to the invention aree temperature-resistant synthetic resins, coatings or foils which remain stable at temperatures up to about 450° C and have excellent flexibility and surface hardness as well as excellent abrasion resistance and resistance to all conventional solvents such as alcohols, aromatic and aliphatic hydrocarbons and esters, ethers and ketones and water. They may contain the usual additives for synthetic resins, such as fillers, pigments, antioxidants or plasticisers.

Details concerning the application of these systems, their miscibility with other polymer systems, test methods and the mechanical values obtainable can be found in German Offenlegungsschrift No. 1,494,443 and U.S. Pat. No. 3,397,253.

EXAMPLE 1

750.0 g of 4,4'-diisocyanatodiphenylmethane are added portionwise to 465.0 g of n-butanol and the mixture is stirred at 140° to 145° C until the isocyanate absorption in the infrared spectrum disappears.

When cold, the solidified melt is crushed to a white powder which has a melting point of 118° to 119° C after crystallisation from acetonitrile.

250.0 g of the resulting compound 4,4'-bis-n-butyoxycarbonyl-aminodiphenylmethane are mixed with 250.0 g of powdered N,N'-bis-[2-methoxycarbonylpropyl-(2)]-4,4'-diaminodiphenylmethane
and the mixture is processed portionwise into a homogeneous, clear, highly fluid melt at 100° C. It has a viscosity of about 45.0 m.Pa.s. at 120° C. During this time, no distinct changes could be observed in the infrared spectrum of the melt. When cold, the solidified melt can easily be crushed to a powder. The melting point was approximately 60° C.

About 400 parts by weight of this powder are introduced into a container which is similar to the usual lacquering baths of wire lacquering machines but can be heated directly and adjustably to elevated temperatures. The low viscosity melt obtained when the powder is heated to 120° C can be used directly for coating wires. A copper wire 0.7 mm in diameter is coated by passing it three times through this melt in a vertical wire lacquering machine. The thickness of the film is adjusted by means of metal stripper nozzles. It is, of course, necessary to ensure that the supports of the nozzles are also kept at an elevated temperature in order to prevent viscosity changes due to a drop in temperature. After it has been coated, the wire is passed through a stoving oven in which the coating undergoes condensation or polymerisation and hardening by the action of heat.

The length of the oven is 4 m, the oven temperature 400° C and the speed of the wire 5 to 7 m per min. The three coatings together increase the diameter of the wire by 40 to 50 μm, i.e. the lacquer film has a thickness of about 20 to 25 μm.

When the lacquered wire is tested, it is found to have a scraping resistance (DIN 46 453) of 100 double strokes.

The wire can be bended round a mandrel of 0.7 mm in diameter without cracking even after a preelongation of 20 %. This corresponds to an external elongation of 80 %.

When the wire is wound round a mandrel of its own diameter, i.e. 0.7 mm, and the resulting wire coil is placed in a heating cupboard at 260° C, no cracks or fractures can be seen in the lacquer film after 60 minutes (DIN 46 453). The cut through temperature determined according to DIN 46 453 is above 320° C.

The breakdown voltage measured on twisted wire samples is between 8 and 9 kV.

The hardness of the lacquer film is 5 H (DIN 46 453). This value remains unchanged even when the lacquer wire is treated in ethanol at 50° C for 30 minutes. The lacquered wire shows no hair cracks under water when bent round a mandrel 10 mm in thickness. This absence of hair cracks is demonstrated by the fact that a direct voltage of 100 V applied between the wire and water bath (0.5 % sodium chloride solution) receives no contact.

EXAMPLE 2

652.0 g of m-cresol are mixed portionwise with
750.0 g of 4,4'-diisocyanatodiphenylmethane and stirred at 140° C until the isocyanate absorption in the infrared spectrum disappears.

When the melt has solidified by cooling, it is crushed to a white powder which can be recrystallised from acetonitrile and has a melting point of 138° to 140° C.
46.7 g of the product, which consistss of 4,4'-dicresoxycarbonylamino-diphenylmethane, are mixed with 358.6 g of 4,4'-bis-n-butoxycarbonylaminodiphenylmethane and
398.4 g of powdered N,N'-bis-[2-ethoxyoxalyl]-4,4'-diamino-diphenylmethane and the mixture is processed to a relatively fluid melt at 110° C. No marked changes can be observed in the infrared spectrum of the melt during a tempering time of about 3 weeks.

When the melt has solidified on cooling, it can easily be crushed to a powder. It has a melting point of about 50° C.

An iron sheet is coated on both sides by dipping it into the melt and the coating is hardened after a stoving cycle of 30 minutes at 240° C followed by 20 minutes at 300° C. A glossy, heat-resistant, elastic film with good surface hardness is obtained.

The parabanate structure in the stoved film is confirmed by the characteristic infrared absorptions at 1720 and 1770 cm$^{-1}$.

The stoving times are reduced by about 40% by adding 0.1 % of a tetraalkyl-1,3-diacetoxy-distannoxane or a cyclic amidine as catalyst to the melt.

The maximum stoving temperature can then be reduced by about 20° to 30° C if the same stoving time is employed.

EXAMPLE 3

322.4 g of 2,4-di-n-butoxycarbonylamino-toluene and
616.7 g of N,N'-bis-[2-methoxycarbonylpropyl-(2)]-1,3-diaminobenzene are mixed, then melted portionwise at 120° C and finally processed into a homogeneous, highly fluid melt with
393.4 g of 2,4-di-cresoxycarbonylamino-toluene. The viscosity of the melt is about 70 m.Pa.s. at 120° C. No change can be observed after a tempering time of 3 weeks at 120° C.

When cold, the melt soldifies to a hard, flakeable mass with a melting point of about 50° C.

The mixture obtained is applied directly to a hard asbestos plate. A hard, glossy, very heat-resistant coating is obtained by stoving at 250° C for 30 mins and at 300° C for 15 minutes.

EXAMPLE 4

308.4 g of N,N'-bis[2-methoxycarbonylpropyl-(2)-1,3-diaminobenzene and
420.0 g of 4,4'-bis-n-butoxycarbonylaminodiphenylmethane are melted together at 110° C and then processed into a highly fluid melt with
46.7 g of 4,4'-bis-cresoxycarbonylaminodiphenylmethane.

This melt has a viscosity of about 70 m.Pa.s. at 110° C.

The solidified melt obtained on cooling has a melting point of 45° C.

The resulting composition is introduced into a heatable apparatus of the kind conventionally used for wire lacquering as described in example 1. When the bath is heated to 100° to 110° C, the liquid becomes so fluid that it can be applied by a roller/-felt system. It is used to coat a wire 0.3 mm in diameter. When the wire is passed twice through the melt, its diameter is increased by about 25 μm. The length of the oven is 3 m, the stoving temperature 400° C. Insulated wires with excellent flexibility and hardness and a heat shock resistance (own diameter) of 260° C are obtained at enamelling speeds of 14 to 18 m per min.

EXAMPLE 5

359.0 g of 4,4'-bis-n-butoxycarbonylamino-diphenylmethane and 398.5 g of N,N'-bis-[2-methoxycarbonylpropyl-(2)]-4,4'-diaminodiphenylmethane are melted together at 120° C and 23.3 g of 4,4'-bis-cresoxycarbonylamino-diphenylmethane and 19.8 g of 44'-bis-N,N'-diethylaminocarbonylamino-diphenylmethane are added portionwise and the mixture is processed into a highly fluid melt. No marked changes could be observed in the infrared spectrum of the melt even after a tempering time of 3 weeks. The material can easily be crushed when it has solidified on cooling. The mixture obtained cann be stoved to form a clear, elastic lacquer film at temperatures as low as 250° C. Its infrared spectrum shows the characteristic bands for the hydantoin structure at 1710 and 1755 cm$^{-1}$. The viscosity is 29.5 m.Pa.s. at 120° C.

A casting apparatus is used to apply the resulting melt at a predetermined thickness to a heat-resistant substrate made e.g. of metal, glass or the like from which the finished foil can easily be removed. Condensation is effected by heating to 240° to 300° C. The finished film can then be lifted from its substrate.

Foils produced in this way have good mechanical properties as well as high heat resistance with a melting point above 330° C.

EXAMPLE 6

308.4 g of N,N'-bis-[2-methoxycarbonylpropyl-(2)]-1,3-diaminobenzene and 322.4 g of di-n-butoxycarbonylamino-toluene (isomeric mixture 2,4:2,6 = 80:20) are melted together at about 100° C and finally mixed with 0.3 g of 2,3-N-dimethyltetrahydro-$^1\Delta$-pyrimidine and processed into a homogeneous, highly fluid melt which has a viscosity of about 100 m.Pa.s. at 100° C. No marked changes can be observed in the infrared spectrum after several days tempering at 100° C. The material which solidifies at about 45° C can easily be crushed when solidified.

The melt produced in this way is used in known manner to coat a copper wire 0.5 mm in diameter and the coating is stoved in an enamelling oven. The coated wire obtained has good flexibility and heat shock resistance and a high cut through temperature and dielectric strength. Its thermal endurance is good, i.e. the values of the properties determined are maintained even after 14 days continued heating at 200° C.

EXAMPLE 7

438.3 g of 4,4'-bis-n-butoxycarbonylamino-diphenylmethane and 11.3 g of caprolactam are melted together at 110° C and mixed with 398.5 g of N,N'-bis-[2-methoxycarbonylpropyl-(2)]-4,4'-diaminodiphenylmethane and processed into a highly fluid melt with a viscosity of 50 m.Pa.s. at 110° C. No marked changes could be observed in the infrared spectrum of the melt after 3 weeks tempering at 110° C. The material which solidifies at about 50° C can easily be crushed when solidified.

A coating obtained from this melt has good heat shock resistance, hardness and solvent resistance. The cut through temperature is above 320° C and the abrasion values are in the region of 100 double strokes.

EXAMPLE 8

119.5 g of N,N'-bis-[2-methoxycarbonylpropyl-(2)]-4,4'-diaminodiphenylmethane and 143.8 g of 4,4'-bis-n-butoxycarbonylamino-diphenylmethane are processed into a highly fluid melt at 120° C. This melt initially has a viscosity of 40.35 m.Pa.s. at 120° C and after 3 weeks tempering the viscosity has risen to 45.6 m.Pa.s. at 120° C. During this time, the typical absorptions for the hydantoin structure at 1710 and 1755 cm$^{-1}$ could not be seen in the infrared spectrum.

The melt can be condensed to a clear, elastic foil either directly or as a powder without any further additives by stepwise tempering at 240° C for 20 minutes and then 300° C for 20 minutes. The infrared-spectrum of this foil has the typical absorptions for the hydantoin structure at 1710 and 1755 cm$^{-1}$. A metal sheet coated with this melt and stoved in the tempering cycle described above can undergo considerable deformation and stretching without the lacquer bursting or cracking.

EXAMPLE 9

375.0 g of a polyester obtained by condensation of 1.6 mol of dimethyl terephthalate, 1.2 mol of ethylene glycol and 0.8 mol of glycerol and containing 6 % by weight of OH-groups are melted at about 80° C. and then mixed with 796.9 g of N,N'-bis-[2-methoxycarbonylpropyl-(2)]-4,4'-diaminodiphenylmethane and 1035.0 g of 4,4'-bis-n-butoxycarbonylamino-diphenylmethane while the temperature is raised to 120° C to produce a low-viscosity melt with 450 m.Pa.s. at 120° C. When solidified the melt turns into a brittle material which can eaily be crushed.

0.05 % by weight of 2-(dimethylaminomethyl)-phenol are added to this melt at about 120° C and a wire coil (according to VDE 0360/21) heated to the temperature of the melt is dipped into the melt. The coil is then transferred to a heating oven which is at a temperature of 120° C, in which the excess melt can drip off. After about 15 minutes, the temperature is raised to 250° C over a period of about 1 hour and then kept at that temperature for about 2 hour. The impregnated coil obtained in this way has a blocking number (Verpackungszahl VDE 0360) of 3.4 at 150° C.

The melt can also be used for impregnating a glass fabric. The fabric treated with the melt is first precondensed at 230° C for 10 minutes. Several such fabrics are then placed on top of one another and hardened in a press under pressure and temperature. The pressure should not exceed 50 kg/cm$^2$ for 2 minutes and may then be raised to about 150 kg/cm$^2$.

The temperature of the press is 230° to 270° C. The total pressing time depends on the number of layers of fabric. For a plate of about 3 mm in thickness it is about 15 minutes. A firm, heat-resistant laminate with good flexural strengths and impact strength is thereby obtained.

EXAMPLE 10

312.0 g of the polyester described in example 9 with a hydroxyl content of 6 % by weight are melted at 100° C and mixed with 398.5 g of N,N'-bis-[2-methoxycarbonylpropyl-(2)]-4,4'-diaminodiphenylmethane and the mixture is then mixed with 199.2 g of 4,4'-bis-n-butoxycarbonylamino-diphenylmethane and 358.4 g of 4,4'-bis-cresoxycarbonylamino-diphenylmethane at 120° C to produce a melt with a viscosity of 410 m.Pa.s. at 120° C. No marked changes could be observed in the infrared spectrum of the melt. The solidified material can easily be crushed.

A glass fabric is steeped in this melt in a suitable apparatus in known manner and then cured in a oven with a length of 8 m by a speed of 0.2 to 1.0 m per min and an oven temperature at 300° C. A flexible lacquered fabric is obtained which has good electric properties which are preserved even after prolonged ageing by heat.

EXAMPLE 11

59.1 g of hexane-1,6-diol and 398.5 g of N,N'-bis-[2-methoxycarbonylpropyl-(2)]-4,4'-diaminodiphenylmethane are melted together at 110° C and mixed portionwise with 565.0 g of 4,4'-bis-n-butoxycarbonylamino-diphenylmethane and 46.6 g of 4,4'-bis-cresoxycarbonylamino-diphenylmethane to produce a melt with a viscosity of 250 m.Pa.s. at 110° C. No marked changes could be observed in the infrared spectrum of the melt while it was being tempered.

This melt is used to coat a wire 0.3 mm in diameter in the manner described above. A lacquered wire with good heat resistance and excellent heat shock resistance at about 240° C, high abrasion resistance, high solvent resistance and high cut through temperature is obtained.

EXAMPLE 12

415.5 g of a bisfunctional carbamic acid-n-butyl ester of the formula

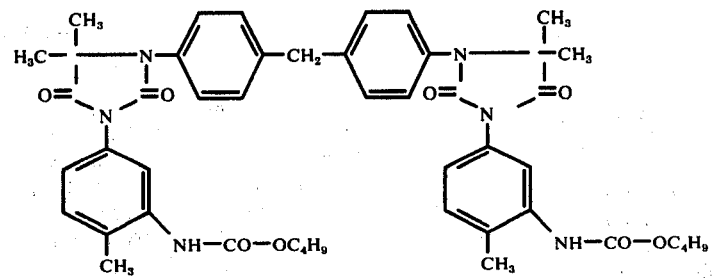

which is obtained by condensation of 1 mol of N,N'-bis-[2-methoxycarbonylpropyl-(2)]-4,4'-diaminodiphenylmethane, 2 mol of tolylene-2,4-diisocyanate and 2 mol of n-butanol and which contains 10.1 % by weight of blocked isocyanate groups are mixed with 199.2 g of N,N'-bis-[2-methoxycarbonylpropyl-(2)]-4,4'-diamino-diphenylmethane and heated to 140–145° C to produce a melt which has a viscosity of about 2700 m.Pa.s. at 140° C. No marked changes can be observed in the infrared spectrum of the melt. The brittle material obtained on solidification of the melt can easily be crushed.

The film obtained by coating a metal sheet with this melt and stoving it at 250° C for 15 minutes and 300° C for 10 minutes has excellent elasticity and good bond adhesion. Alternatively, the dipped metal sheet may be placed on a conveyor belt and moved at a rate of 12 to 36 meters per minute past a high-frequency induction source of the Type HG/6-6-SIH, 6 kW, manufactured by Siemens, power consumption 12 kVA, and in this way hardened directly. The coatings obtained have a pencil hardness of 5 H.

EXAMPLE 13

358.5 g of 4,4'-bis-n-butoxycarbonylamino-diphenylmethane and 318.8 g of N,N'-bis-[2-methoxycarbonylpropyl-(2)[-4,4'-diaminodiphenylmethane are melted together at 120° C and then mixed portionwise at 120° to 130° C with 320.0 g of an epoxide compound with an epoxide equivalent weight of 1900 to 2200 prepared by reacting epichlorohydrin with diphenylolpropane and 46.7 g of 4,4'-bis-cresoxycarbonylamino-diphenylmethane, and the mixture is processed into a melt with a viscosity of 1725 m.Pa.s. at 130° C. No typical bands for the hydantoin or oxazolidone ring can be seen in the infrared spectrum of the melt. The material, which solidifies at 55° C, can easily be crushed when solidified.

The melt is cast by the process described in example 5 and condensed to a foil within 1 hour in a tempering cycle of 200° to 300° C. The foil has excellennt flexibility, good solvent resistance, high heat resistance and very good electrical properties which are preserved even after prolonged ageing by heat.

Deep-drawn metal sheets coated with such a lacquer can be stretched or bent to an extraordinary degree without any cracks or fractures being formed in the film.

EXAMPLE 14

793.0 g of 4,4'-bis-cresoxycarbonylamino-diphenylmethane, 39.0 g of di-cresoxycarbonylamino-toluene (isomeric mixture 2,4:2,6 = 80:20), 87.7 g of 4,4'-bis-phenoxycarbonylamino-diphenylmethane and 797.0 g of N,N'-bis-[2-methoxycarbonylpropyl-(2)]-4,4'-diaminodiphenylmethane are thoroughly mixed in a finely powdered form.

The homogeneous white powder thereby obtained may, for example, be processed into a melt at 120° C with a viscosity of 355 m.Pa.s. It solidifies at 40° C to an easily crushed product.

The powder can also be used directly for the production of coatings. It is then immaterial whether the powder is obtained directly by grinding the dry, mixed starting materials or by crushing the solidified primary melt. As a specific example, the powder may be stoved in a cycle of 30 minutes at 250° C and 20 minutes at 300° C after application on an iron sheet to produce a glossy, elastic film or coating with a surface hardness of 5 H. The softening temperature is above 330° C.

The infrared spectrum of a film produced in this way has the typical absorptions for the hydantoin structure at 1710 and 1755 cm⁻¹.

EXAMPLE 15

398.5 g of N,N'-bis-[[2-methoxycarbonylpropyl-(2)]-4,4'-diaminodiphenylmethane are processed with 616.3 g of 4,4'-bis-ethoxycarbonylamino-diphenylmethane and 46.6 g of 4,4'-bis-cresoxycarbonylamino-diphenylmethane at 115° C to produce a melt with a viscosity of about 40 m.Pa.s. at 115° C. The mixture is tempered at 150° C for 1 hour and then cooled to 100° C.

308.4 g of N,N'-bis-[2-methoxycarbonylpropyl-(2)-1,3-diaminobenzene are then added. A highly fluid melt with a viscosity of about 180 m.Pa.s. at 100° C is thereby obtained.

The characteristic absorption for partially formed oligohydantoin at 1710 and 1755 cm⁻¹ can be seen in the infrared spectrum.

Small preheated plates of sheet mica are coated with the highly fluid melt at about 120° C. The plates are then cooled and when the coating has solidified they are stacked together in the usual manner and hardened between polished sheet metals in a press at 250° C for 30 minutes and 300° C for 30 minutes. Laminated sheet mica plates with good heat resistance and good electrical insulating properties are obtained.

EXAMPLE 16

205.4 g of 4,4'-bis-ethoxycarbonylamino-diphenylmethane, 188.6 g of 4,4'-bis-methoxycarbonylamino-diphenylmethane, 239.0 g of 4,4'-bis-n-butoxycarbonylamino-diphenylmethane and 797.0 g of N,N'-bis-[2-methoxycarbonylpropyl-(2)]-4,4'-diamino-diphenylmethane are added to each other portionwise in any desired sequence at 120° C to produce a melt. After the addition of 72.5 g of di-phenoxycarbonylamino-toluene (isomeric mixture 2,4:2,6 = 80:20), the mixture is tempered for 30 minutes at 170° C. A light-brown melt with a viscosity of about 140 m.Pa.s. at 120° C is obtained. The typical absorption bands for oligohydantoins at 1710 and 1755 cm⁻¹ are found in the Infrared-spectrum.

This melt is used to coat a copper wire 0.4 mm in diameter by passing the wire three times through a wire enamelling machine with heat-controlled applications equipment as already described above. The coated wire obtained has very good heat and solvent resistance, high heat shock properties, abrasion-values of 100 double strokes, good flexibility and a cut through temperature above 330° C.

EXAMPLE 17

400.0 g of 4,4'-diisocyanatodiphenylmethane.

110.0 g of a higher homologue of polyphenylene methylene polyisocyanate (31.6 % by weight isocyanate, approximately 30 % by weight of trivalent and higher-valent compounds, m.Pa.s. 25° C = 110)

282.0 g of n-butanol and 22.0 g of m-cresol are stirred while the temperature is gradually raised from 110° C to 140° C until no more free isocyanate-groups can be detected in the infrared spectrum of the melt. The melt is then mixed portionwise at 120° C with 797.0 g of N,N'-bis-[2-methoxycarbonylpropyl-(2)]-4,4'-diaminodiphenylmethane. A melt with a viscosity of about 280 m.Pa.s. at 120° C is obtained. No marked changes can be observed in its infrared spectrum even after prolonged tempering at 110° to 130° C.

Metal sheets coated with the melt at about 130° C by spray process are stoved for 30 minutes at 250° C and 15 minutes at 300° C.

A glossy, highly heat-resistant film with great surface hardness is obtained. It has a softening point above 330° C and good abrasion resistance.

We claim:

1. A process for the production of a foil, coating or other shaped product of a polyhydantoin or polyparabanic acid, wherein, in order to prepare the polyhydantoin, a bis- or polyglycine derivative of the formula

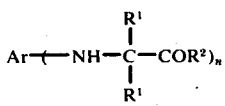

wherein Ar is an $n$-valent aromatic group; the groups $R^1$, which may be the same or different, are hydrogen, aryl or alkyl; $R^2$ is hydroxyl, amino, alkylamino, dialkyl-amino, alkoxy or aroxy and $n$ is 2, 3 or 4, or, in order to prepare the polyparabanic acid, a bis- or polymonoamidooxalic acid of the formula

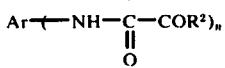

wherein Ar, $R^2$ and $n$ are as aforesaid, is heated in the absence of a solvent with at least one blocked reaction product of a di- or poly(thio) isocyanate and a compound containing Zerewitinoff-active hydrogen atoms, to a temperature which obtains a highly fluid melt having a melt viscosity of at most 40,000 m.Pa.s without unblocking said blocked reaction product and the resulting melt is subjected to a shaping process and polycondensed at a temperature of from 150° to 400° C.

2. A process as claimed in claim 1 wherein the di- or polyiso(thio)cyanate derivative is based on an iso(thio)cyanate of the formula

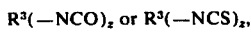

in which $R^3$ is alkyl having 1 to 20 carbon atoms; an aromatic group having 5 to 12 carbon atoms; cycloalkyl having 4 to 12 carbon atoms; an aliphatic-aromatic group having 6 to 36 carbon atoms or an aromatic or cycloaliphatic group having 3 to 12 carbon atoms which contains a hetero atom and $z$ is an integer of from 1 to 4.

3. A process as claimed in claim 1 in which the bis- or polyglycine derivative or bis- or poly-monoamidooxalic acid derivative is heated with the di- or poly iso(thio)-cyanate derivative to a temperature of from 70° to 180° C.

4. A process as claimed in claim 1 wherein Ar is an aromatic group having 6 to 12 carbon atoms.

5. A process as claimed in claim 1 wherein Ar represents an aromatic group which contains hetero atoms.

6. A process as claimed in claim 1 wherein at least one of the groups $R^1$ is an alkyl group having 1 to 4 carbon atoms.

7. A process as claimed in claim 1 wherein the alkyl moieties contained in the substituent $R^2$ having 1 to 4 carbon atoms. glycerol;

8. A process as claimed in claim 1 wherein the aryl moieties contained in the substituent $R^2$ have 6 to 10 carbon atoms.

9. A process as claimed in claim 1 wherein the di- or polyglycine derivative is N,N'-bis-[ethoxycarbonylmethyl]-4,4'-diamino-diphenylmethane; N,N'-bis-[2-methoxycarbonylpropyl-(2)]-4,4'-diamino-diphenylmethane; N,N'-bis-[2-methoxycarbonylpropyl-(2)]-4,4'-diaminodiphenyl ether or N,N'-bis-[2methoxycarbonylpropyl-(2)]-1,3-diaminobenzene.

10. A process as claimed in claim 1 wherein the bis- or poly-monoamidooxalic acid is N,N'-bis-[ethoxyoxalyl]-4,4'-diaminodiphenylmethane or N,N'-bis-[ethoxyoxalyl]-4,4'-diaminodiphenyl ether.

11. A process as claimed in claim 1 wherein the di- or polyiso(thio)cyanate is blocked with an alcohol.

12. A process as claimed in claim 11 wherein the alcohol is an aliphatic monohydric alcohol having 1 to 16 carbon atoms, a cycloaliphatic alcohol having 5 to 12 carbon atoms, an aliphatic diol or polyol with 1 to 12 carbon atoms or a phenol having 6 to 12 carbon atoms.

13. A process as claimed in claim 11 wherein the di- or polyiso(thio)cyanate is blocked with an oxime, secondary amine, cyclic amine or cyclic amide 14. A process as claimed in claim 1 wherein the di- or polyiso(thio)cyanate derivative comprises a mixture of blocked poly(iso)thiocyanates, in which 1 to 99 equivalent percent of the polyiso(thio)cyanates are blocked with an alkanol or cycloalkanol and 99 to 1 equivalent percent are blocked with a phenol, oxime or lactam.

15. A process as claimed in claim 14 wherein 50 to 99 equivalent percent of the polyiso(thio)cyanates are blocked with an alkanol or cycloalkanol and 50 to 1 equivalent percent are blocked with a phenol, oxime or lactam.

16. A process as claimed in claim 1 wherein equivalent quantities of di- or poly-glycine derivatives or bis- or poly-monoamido oxalic acid derivatives are heated with di- or polyiso(thio)cyanate derivatives.

17. A process as claimed in claim 1, characterised in that a quantity of $2/p$ to $4/p$ mol of the polyiso(thio)-cyanate derivative with $p$ blocked NCO-groups per molecule is used for 1 mol of bis-glycine or bis-monoamidooxalic acid derivative, where $p$ is >1.

18. A process as claimed in claim 1, characterised in that the di- or poly iso(thio)cyanate derivatives are prepared directly in the reaction mixture by reaction of the corresponding iso(thio)cyanates with the blocking agents and then mixed and reacted with the di- or poly glycine derivatives or bis- or poly-monoamidooxalic acid derivatives.

19. A process as claimed in claim 1, wherein the polycondensation is carried out in the presence of low-molecular weight polyols, hydroxyl-containing epoxides, urethanes, imide esters, hydantoins, polyesters or polyethers and polyamines, aminoalcohols, polyamides, polyester imides or polyamido imines.

20. A process as claimed in claim 1 wherein up to 20 mols % of the blocked polyiso(thio)cyanate is replaced by a blocked monoisocyanate or monoisothiocyanate.

21. A process as claimed in claim 1 wherein the condensation reaction is accelerated by an isocyanate polyaddition catalyst.

22. A process as claimed in claim 21 wherein the isocyanate polyaddition catalyst is a tertiary amine; a silaamine with carbon-silicon bonds; a blocked nitrogen-containing base; an organic metal compound; a blocked aromatic hydroxy compound or a phenol-Mannich base.

23. A process as claimed in claim 21 wherein the catalyst is used in a quantity of from 0.01 to 5 % by weight, based on the blocked isocyanate.

24. A process as claimed in claim 23 wherein the catalyst is used in a quantity of from 0.1 to 1.0 % by weight, based on the blocked isocyanate.

25. A polyhydantoin or polyparabanic acid when prepared by a process as claimed in claim 1.

* * * * *